(12) United States Patent
Economou

(10) Patent No.: US 11,887,570 B2
(45) Date of Patent: Jan. 30, 2024

(54) EXTRACTING FEATURES FROM AUDITORY OBSERVATIONS WITH ACTIVE OR PASSIVE ASSISTANCE OF SHAPE-BASED AUDITORY MODIFICATION APPARATUS

(71) Applicant: George A. Economou, Fairfax, VA (US)

(72) Inventor: George A. Economou, Fairfax, VA (US)

( * ) Notice: Subject to any disclaimer, the term of this patent is extended or adjusted under 35 U.S.C. 154(b) by 741 days.

(21) Appl. No.: 16/709,795

(22) Filed: Dec. 10, 2019

(65) Prior Publication Data

US 2020/0265819 A1    Aug. 20, 2020

Related U.S. Application Data

(63) Continuation of application No. 15/235,196, filed on Aug. 12, 2016, now Pat. No. 10,504,499.

(60) Provisional application No. 62/203,942, filed on Aug. 12, 2015.

(51) Int. Cl.
   *G10K 11/04* (2006.01)
   *G01H 3/00* (2006.01)
   *H04R 1/34* (2006.01)

(52) U.S. Cl.
   CPC ............... *G10K 11/04* (2013.01); *G01H 3/00* (2013.01); *H04R 1/342* (2013.01)

(58) Field of Classification Search
   CPC ........... H04R 1/342; G10K 11/04; G01H 3/00
   USPC ................................................... 181/30, 126
   See application file for complete search history.

(56) References Cited

U.S. PATENT DOCUMENTS

| | | | | |
|---|---|---|---|---|
| 4,701,951 A | * | 10/1987 | Kash | H04R 5/02 381/160 |
| 8,091,605 B1 | * | 1/2012 | Melhart | A47G 5/00 160/351 |
| 8,191,678 B2 | * | 6/2012 | Zou | G10K 11/168 381/189 |
| 9,051,734 B2 | * | 6/2015 | Dupuy | G10K 11/28 |
| 10,714,069 B1 | * | 7/2020 | Ratner | B64C 39/024 |
| 10,760,265 B2 | * | 9/2020 | Perdue | E06B 3/48 |
| 10,961,735 B2 | * | 3/2021 | Olsson | E04H 1/12 |
| 2006/0060420 A1 | * | 3/2006 | Freiheit | E04B 1/8236 181/287 |
| 2006/0266579 A1 | * | 11/2006 | Stern | G10K 11/08 181/178 |
| 2011/0249100 A1 | * | 10/2011 | Jayaram | H04N 13/239 348/48 |

\* cited by examiner

*Primary Examiner* — Forrest M Phillips
(74) *Attorney, Agent, or Firm* — David H. Judson

(57) ABSTRACT

This disclosure provides for an auditory modification apparatus to facilitate extraction of information from an auditory observation stream. The approach may be used to reveal features about the environment, or to simplify processing of the incoming audio stream. The apparatus acts on the incoming auditory stream by nature of its shape, and that shape either is passively static or actively manipulated. Preferably, the apparatus has given shape characteristics to reveal features of the environment, such as directionality of a noise, size of an enclosed space, or materials of its construction, that are not otherwise detectable or easy to process with conventional approaches. Further advantage exists in the notion of actively manipulating the shape of the apparatus in conjunction with its operation to facilitate information extraction in a dynamic manner.

9 Claims, 5 Drawing Sheets

EXTRACTING FEATURES FROM AUDITORY OBSERVATIONS WITH ACTIVE OR PASSIVE ASSISTANCE OF SHAPE-BASED AUDITORY MODIFICATION APPARATUS

BACKGROUND

Technical Field

This disclosure relates generally to audio processing methods and systems.

Related Art

The anatomy of the human ear, and its impact on processing of received sounds in the environment, have been widely investigated and studied. One approach, such as described in U.S. Publication No. 2008/0050710, is to provide a training model of the human ear to train new doctors and medical students to diagnose pathologies that might impact hearing. In that disclosure, an anatomical model for training includes a head portion, at least one auricle portion, at least one ear canal, and a cartridge. The cartridge is adaptable to mimic at least one pathology of the human ear. Another approach to providing an anatomical model of this type for training purposes is described in U.S. Publication No. 2012/0088215. This publication describes an otoscopic model that includes an artificial ear, an artificial head and at least one tympanic membrane portion. The artificial ear includes a base portion and an ear portion extending from the base and having ear-like features including an auditory canal. The artificial head includes an opening adapted to receive the base portion. The at least one tympanic membrane portion includes an artificial tympanic membrane. The tympanic membrane portion is configured to be coupled with the artificial ear such that the artificial tympanic membrane is located relative to the auditory canal in a generally anatomically correct manner. Other modeling and measuring approaches include, for example, U.S. Publication No. 2015/0341733, which describes a measurement device for evaluating an acoustic device, where the acoustic device allows sound to be heard via vibration transmission by having a housing provided with a vibrating element to be held by a head including a human ear. The measurement device includes an ear model unit modeled after a human ear, a model of a human body that holds the acoustic device, and a vibration detector disposed in the ear model unit.

While these and other devices and techniques like are useful, e.g., for medical training, there remains a need to provide improved devices and methods.

BRIEF SUMMARY

This disclosure describes a method and apparatus to extract information from an auditory observation stream, preferably using a shape-based auditory modification apparatus. The approach may be used to reveal features about the environment, or to simplify processing of an incoming audio stream. The apparatus acts on the incoming auditory stream by nature of its shape, and that shape either is passively static or actively manipulated. Preferably, the shape-based auditory modification apparatus has given shape characteristics to reveal features of the environment, such as directionality of a noise, size of an enclosed space, or materials of its construction, that are not otherwise detectable or easy to process with conventional approaches. A further advantage exists in the notion of actively manipulating the shape of the apparatus in conjunction with its operation to facilitate information extraction in a dynamic manner.

The foregoing has outlined some of the more pertinent features of the subject matter. These features should be construed to be merely illustrative.

BRIEF DESCRIPTION OF THE DRAWINGS

For a more complete understanding of the disclosed subject matter and the advantages thereof, reference is now made to the following descriptions taken in conjunction with the accompanying drawings, in which.

DETAILED DESCRIPTION

Figure 1:
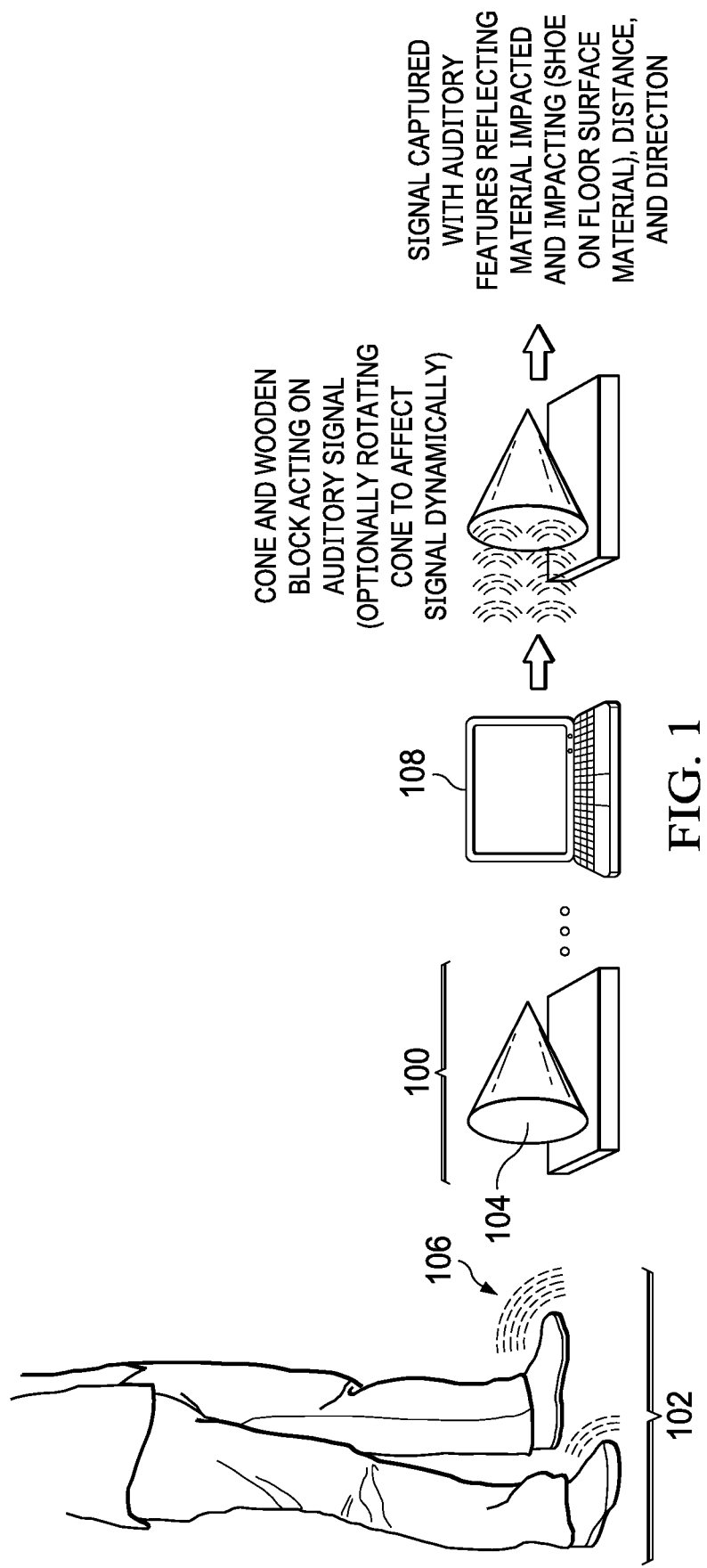
FIG. 1 depicts a representation of a measurement system in which the shape-based auditory modification apparatus of this disclosure may be implemented.

By way of background, and as depicted in FIG. 1, an auditory modification apparatus 100 of this disclosure is adapted to be used in association with the following representative elements and operations: an environment 102, such as a room or outdoor space, an auditory measurement sensor 104 (e.g., a microphone) to capture an auditory signal 106, the auditory modification apparatus 100 situated in such a manner that partially occults or envelops the measurement sensor 104, and a processing node 108 connected to the measurement sensor 104 and optionally the apparatus 100. As will be described, the auditory modification apparatus 100 possesses a shape or configuration that can be changed, and it acts in some measurable manner on the auditory signal 106. There is no requirement that any particular type of measurement sensor 104 or processing node 108 be used, and such technologies are well-known. The processing node may include one or more computing entities that include hardware, computer memory, and one or more computer programs that provide auditory signal processing. Additional elements not shown include analog-to-digital converters, filters, and the like, that are commonly-used in auditory signal processing. Once again, the particular details of such systems, devices, technologies and algorithms are not the subject of this disclosure.

Generally, and in one embodiment, the auditory modification apparatus 100 includes an open structure designed to act on auditory waves flowing through it. In a simple implementation approach, the apparatus comprises a tube of cylindrical shape, or a modified cylindrical shape, that is designed to possess characteristic resonance frequencies for sounds moving through the shape. These resonant frequencies allow easier detection of faint signals directionally via automatic amplification. In an alternative embodiment, the apparatus 100 includes an internally-enclosed or partially-enclosed cavity that is designed to act on auditory waves that reach it but preferably not that flow through it. For example, the cavity may be a cave-like shape that creates an echo-like or reverberant effect at various frequencies depending on its shape and size. As another variant, the apparatus has an enclosed cavity filled with a specific material that combines both the effect of its shape and the effect of the material on sound waves. An example of this latter approach is a water-filled or viscous-fluid-filled cavity or other dispersive or non-homogeneous medium; such a cavity acts both on the speed of any sound waves reaching it, and also resonate or echo based on its shape. Without limitation, the apparatus comprises one or more components leveraging different materials, which materials have different reflective acoustic response characteristics. Representative but non-limiting materials include wood, stone, and metal, each of which reflect sound differently. The apparatus may also include components with a reflective surface. In general, the apparatus comprises one or more of these components, and wherein each such component may act on the auditory signal in a different manner, as may be suitable to the features of the auditory signal that are being extracted or pre-processed using the device.

The apparatus may comprise a synthetic human ear shape, including both inner and outer ear shape aspects, and possessing various sections resonant to various frequencies, and/or reflective at various distances from the microphone. In another embodiment, the apparatus comprises a synthetic human ear shape that rotates in various directions, preferably around three axes, to allow directional-specific, frequency-specific resonance to be directed actively during measurement. As will be seen below, an apparatus may comprise a combination of components having multiple characteristics, such as: a large object with an asymmetric acoustic aperture, to affect larger wavelengths and frequencies unilaterally or directionally; multiple internal cavities, some hollow and diverse in shape to resonate to specific frequencies specific to echolocation-specific techniques, and another cavity with asymmetric shape and possessing a viscous fluid within, and an element of malleability to its shape. Further, a simple combination of multiple materials in small block or small component shape format, and that can be manipulated (e.g., by a robotic frame for active re-orientation of shape and materials as needed for frequency and directionality response measurements), provides one implementation that provides useful detection capabilities. In an alternative embodiment, multiple apparatus of this type are situated to create binaural effects on incoming auditory signals to facilitate location and directionality determinations.

With reference again to FIG. 1, a detection method employs the following steps. The apparatus 100 is positioned on, around, or near the microphone 104 (or other measurement device) in a manner that allows its shape to act on the auditory signals 106. Preferably, the auditory modification apparatus has a shape and configuration that employs combinations of constructive, destructive, diffractive, reflective, reverberant, dispersive and phase-shifting activities on the auditory signal. The auditory signal 106 passes from the environment 102 across apparatus 100, which then acts on the auditory signal in a manner that transforms the signal, preferably prior to its reception at the measurement sensor 104. Such transformation typically involves transforming the signal's amplitude, phase, frequency, or other characteristics via constructive, destructive, diffractive, reflective, reverberant, dispersive and/or phase-shifting effects. The microphone 104 measures the auditory signal 106, as acted upon by the apparatus 100, and by the action of the apparatus thereby extracts characteristics of environment 102. The characteristics include, without limitation: directionality of the audio signal source, the nature and extent of the audio processing functionality caused by the apparatus, detection of very small amplitude signals whose frequency resonates due to the shape the apparatus but would otherwise be unnoticeable, and so forth. One or more of these characteristics can then be further processed as desired depending on the application. In a variant, processing node controls a mechanism to act dynamically on the apparatus 100 to change its physical shape, viscosity, chemical composition, material, or other properties, during the monitoring and measurement of the signal, thereby creating a dynamic action over time.

The following provides additional details regarding several possible structural implementations for the apparatus of this disclosure.

Figure 2:
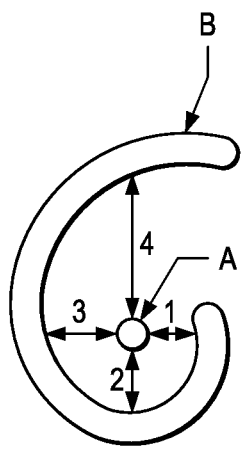
FIG. 2 depicts a portion of the auditory modification apparatus of this disclosure and, in particular, a two-dimensional view of a three-dimensional surface thereof that partially occludes incoming auditory signals, acting on them in a manner to produce minor reflective patterns that vary in time based on the direction of the incoming signal.

FIG. 2 demonstrates a two-dimensional view of a three-dimensional surface that partially occludes incoming auditory signals, thereby acting on them in a manner to produce minor reflective patterns that vary in time based on the direction of the incoming signal. In this example, item A represents an auditory measurement node, and item B represents a reflective surface that reflects auditory signals in some manner based on its material construction. As depicted, the reflected signal arrives at the measurement node A at varying times based on the direction of the source signal in relation to the measurement node, with a time variance based on the distance of the surface from the measurement node. For example, a reflection from a source positioned directly opposite the part of the surface labeled 1 generates a short time delay, directly opposite the part labeled 2 generates a longer time delay, opposite the part labeled 3 generates a longer delay, and opposite the part labeled 4 generates the longest delay. As a continuous surface, the delay varies in a linear manner based on the directionality of the source, however, the surface can be constructed with flat elements or in a different structure to create differing reflective timing characteristics.

Figure 3:
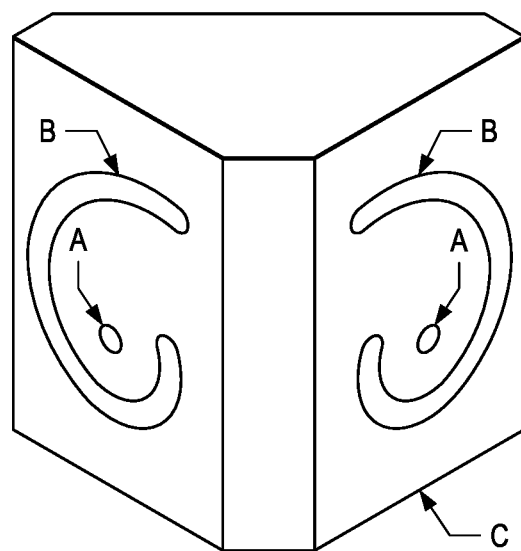
FIG. 3 depicts an example of two instances of the portions shown in FIG. 2, with the two instances situated in a manner to produce binaural measurements at two measurement points.

FIG. 3 depicts an example of two instances B (as depicted in FIG. 1), with the two instances situated in a manner to produce binaural measurements at the two measurement points A. The binaural measurements typically vary in timing based on the distance, in the horizontal plane, of the position of the auditory signal source. The surfaces that surround the measurement nodes further act on the incoming signal in a manner that produces different reflections in time based on the vertical plane position. The combination of using two measurement nodes A and the reflective surface B, as a combined apparatus, allows determination of the three-dimension position of the auditory signal's source. In particular, items A in FIG. 3 represent two distinct measurement nodes positioned, in this example, directly opposite one another on the outside surfaces of a three-dimensional object. Items B in FIG. 3 represent reflective surfaces on the plane surrounding the measurement nodes, in a manner so as to produce partial reflective signals of varying time based on the directionality of the incoming auditory signal. Item C in FIG. 3 represents an arbitrary three-dimensional object. In this example, the width is exaggerated for illustration purposes only, but it can be of arbitrary shape.

Figure 4:
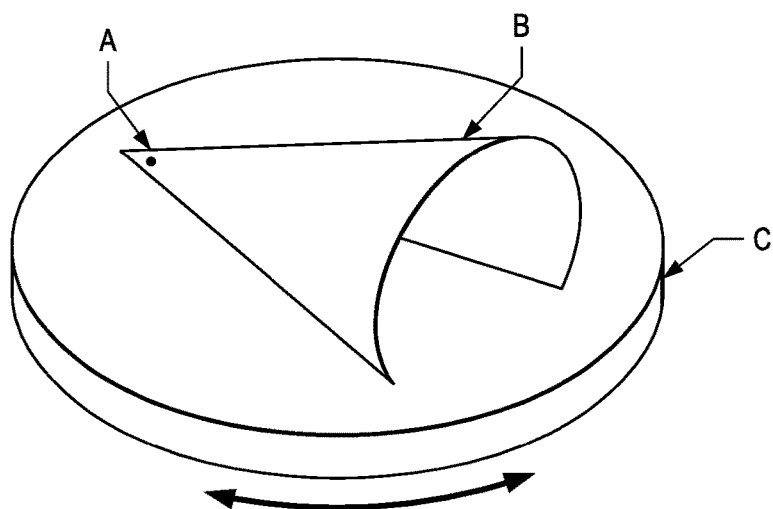
FIG. 4 depicts an example auditory modification apparatus of this disclosure according to a first embodiment that is designed to focus on direction.

FIG. 4 depicts an example of an apparatus of this disclosure designed to explicitly focus on direction only through the use of a conical structure B that allows, and optionally amplifies, signals from a certain direction in space, while being constructed in a manner that muffles or silences signals from outside the extension of this conical shape in space. The platform 404 upon which the structure 402 rests can be rotated (e.g., by rotating a support) to assess a position that maximizes amplitude, representing the direction of the signal source. In this example embodiment of FIG. 4, item A is a measurement node situated within or at the base of the conical structure B. Preferably, the conical structure is made out of a material that possesses reflective properties internally and externally, so as to produce amplification or filtration of incoming signals from an area in space originating within the projection of the conical structure, and muffling or reflecting signals outside of this projection area. Note that a conical structure is used for purposes of this example, but the structure can possess a similar shape that acts heavily to filter auditory signals that do not originate from a specific directionality. Item C in FIG. 4 is a platform that rotates to demonstrate the basic notion of a two-dimensional directional detection facilitated by measurement of signal amplitude, based on the action of item B on an auditory source. Note that a three-dimensional directional measurement may be implemented, e.g., using a surface that rotates along an additional axis for such effect.

Figure 5:
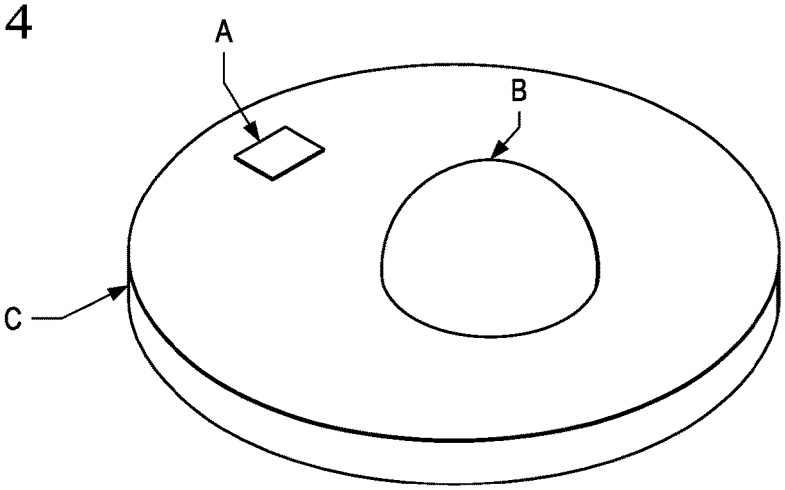
FIG. 5 depicts an example auditory modification apparatus of this disclosure according to a second embodiment that is designed as fluid- or air-filled, and that, based on its material, creates multiple reflections of incoming auditory signals.

FIG. 5 depicts an example of a fluid- or air-filled apparatus placed beside or near a measurement node, which based on its material creates multiple reflections of incoming auditory signals. These reflections typically repeat over time as the signal reflects within the apparatus, generating multiple signals whose arrival time and strength at the measurement node are related to the position of the auditory signal's source. Item A in FIG. 5 represents an auditory measurement node. Item B represents a bladder of air or fluid, constructed of a material whose exterior is partially but not wholly reflective to sound, and an interior which may possess a material within which the sound of air travels at a different rate than the surrounding medium. For example, if the entire apparatus is underwater, the contents of the bladder may be air, or vice versa. The shape of B is arbitrarily a sphere in this example, for simplicity purposes, but the shape of B will act upon a signal in a reflective manner, producing minor reflections which manifest as echoes to item A based on the direction of the auditory signal source. Item C is an arbitrary and optional base for positioning items A and B.

Figure 6:
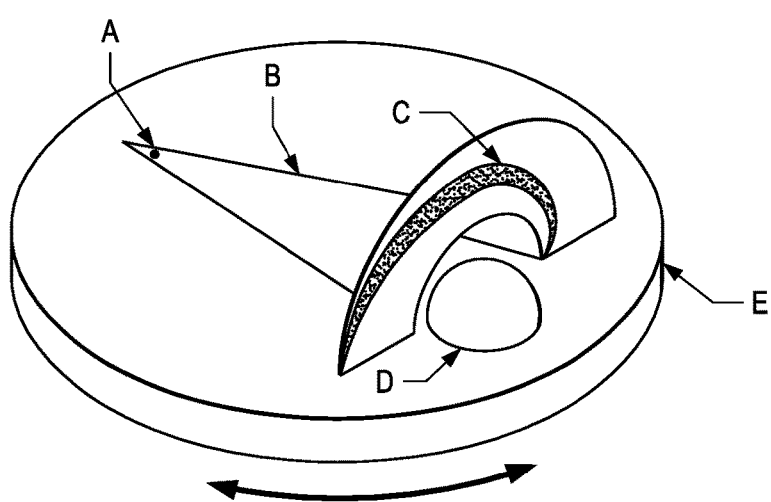
FIG. 6 depicts an example auditory modification apparatus of this disclosure that is combination of the FIG. 2, FIG. 4 and FIG. 5 embodiments and that provides a directional-focused action via a conical direction structure that can be repositioned, together with a fluid-filled or air-filled bladder that creates multiple reflections of incoming auditory signals based on the directionality of the source.

FIG. 6 depicts a combination of the prior apparatus from FIG. 2, FIG. 4 and FIG. 5, and in particular representing a combination of strict directional-focused action via a conical direction structure that can be repositioned. This apparatus includes a further "fine" directional action due to a spiral (or similar reflective surface situated in a manner so as to produce varying distances for different directions) structure upon a surface immediately outside the conical structure. The apparatus includes a fluid-filled or air-filled bladder that, as noted above, creates multiple reflections of incoming auditory signals based on the directionality of the source. In this example, Item A is an auditory measurement node situated at the base of a conical structure B. Item B is an example of the primary apparatus of FIG. 4, namely, a conical or similar structure that produces stronger amplitude of signals at Item A based on its directional alignment with the signal source. Item C is an example of the primary apparatus shown in FIG. 2, namely, a structure that produces reflections based on the directionality of the source in relation to the plane which the surface is on. In this example, the plane represents a flat surface surrounding the opening of the conical structure B, but it can be also incorporated within the conical structure instead, or on some similar surface between item A and the auditory signal source. Item D in FIG. 6 is a bladder as described above in connection with FIG. 5, acting in a manner that produces time-varying reflective signals based on the direction of the source as well. Item E in FIG. 6 is a candidate surface upon which the apparatus elements are placed, and that can optionally rotate. In this diagram, circular rotation is outlined by the arrow, however, item E can be constructed in a manner so as to produce multiple axes of movement facilitating three-dimensional repositioning.

The apparatus as described herein provides significant advantages. As the above examples illustrate, the subject matter herein provides for a device with a structure that can be optionally changed to modify the effect on the measured auditory signal. The apparatus can be shaped like an ear, but it need not be. Rather, the approach herein provides a more general and malleable approach to affecting the acoustics of the auditory signal through a combination of shape, material, and resonance.

One application of the apparatus is to have an asymmetric structure of two or more reflective surfaces or cavities surrounding dual measurement points. This produces a binaural measurement that reproduces stereo effects by being a dual measurement, as sounds arrive at each measurement point at different times. It also captures directional-specific measurements caused by reflection on the asymmetric reflective surfaces, which will cause minor reflective echoes to reach the measurement nodes at slightly different times based on the direction of the incoming signal, thereby allowing a computing device to detect the directionality of an auditory signal by simply calculating the difference in timing of received signals and reflections at each measurement node. This technique allows one to record stereo sounds with directional characteristics that will be preserved if played back via headphones in humans, but the same directional effect can be computed to process information about sounds and sources to measure a room/chamber/environment as well for various consumer or automation purposes, including robotic or autonomous systems.

Another application of the apparatus is to leverage a shape that causes directional amplification of the incoming auditory signal, via a cone or canal like structure with a material exterior that absorbs acoustic signals that cannot directly enter the structure. The directional structure is slowly rotated while measuring ambient, or synthesized, sound sources to determine the number of sound sources and their directionality within the room, e.g., by identifying the apparatus directionality that results in the maximum amplitude signal observed, and that can be repeated for multiple sound sources.

The use of a fluid- or air-filled cavity near the measurement source is similar to that of the reflective surfaces or varying reflective media; it creates a chamber that causes reflection and further a repeated reflection due to being a chamber, thus creating multiple modified resultant signals at time delays from the original signal. These resultant reflective echo signals are processed simply using time delay models to ascertain distance, and directionality, from an incoming signal. Focused directional measurement of signals conducted continuously or in a repeated fashion can be used to detect the size and shape of an object when combining time-based distance measures with identification of directional aspects which maximize amplitude.

Figure 7:
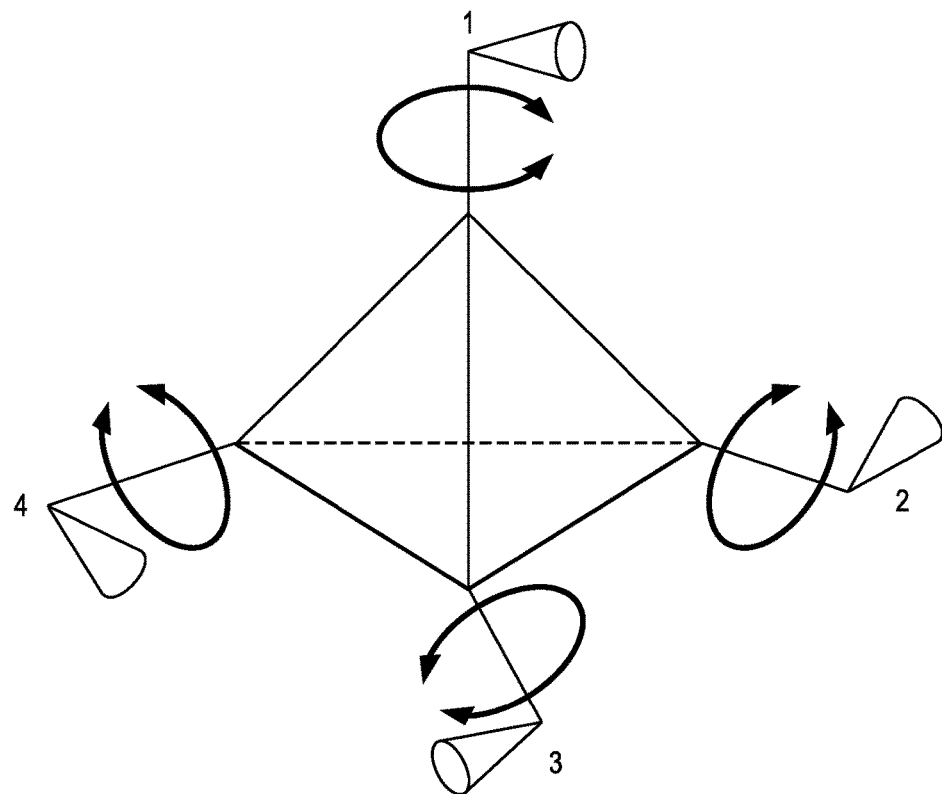
FIG. 7 depicts another example configuration of the auditory modification apparatus that is focused specifically on rapid determination of auditory source directional characteristics in three dimensions for a single sound source.

FIG. 7 provides another example configuration of the auditory modification apparatus that is focused specifically on rapid determination of auditory source directional characteristics in three dimensions for a single sound source. In this embodiment, rapid directionality in three dimensions is facilitated by using directionally-specific apparatus, preferably the conical structures outlined below, together with the ability to rotate each around an axis. In particular, to maximally cover three-dimensional space at a given point of measurement, one can employ four (4) such apparatus in relative locations equating to the four vertices of a tetrahedron, as outlined in FIG. 7, as items 1, 2, 3, and 4. As two measurements of an auditory source may not reveal its direction fully based on the time difference in arrivals alone, in this embodiment three measurements are used to rapidly and accurately determine directionality. In three dimensions, this configuration of four apparatus placed in a manner equating to the four vertices of a tetrahedron allows any object in three dimensions around the apparatus as a whole to be covered by at least three of the conical measurement apparatus for purposes of detecting the directionality of the signal. The choice of a tetrahedron in the diagram is to simplify the explanation, and any arbitrary structure can be used. The rotation of the conical structures can be controlled by an automated mechanism or non-automated approaches, but this structure presents a useful mechanism to leverage passive auditory sensing to determine directional location in three dimensions. To apply such an apparatus to individual sound signals, one would first leverage the first such observation to identify the manner in which to position the conical structures for a second observation, and within further measurements, adjust the conical structures' directionality to identify a configuration that maximizes the signal strength in all three measurement nodes that cover the signal source.

Without limitation, some candidate commercial applications for a device as shown in FIG. 7 include tracking or analysis of the movement of individual objects, such as hunting game, identifying the location of faint noises caused by structural weakness in a building or other construction, identification of the location of geologically-originating sounds such as within a cave or glacier, identification of the direction of specific seismic observations, or application within hazard avoidance techniques for autonomously controlled or remotely controlled automobiles, planes, nautical vessels, or underwater vehicles.

Figure 8:
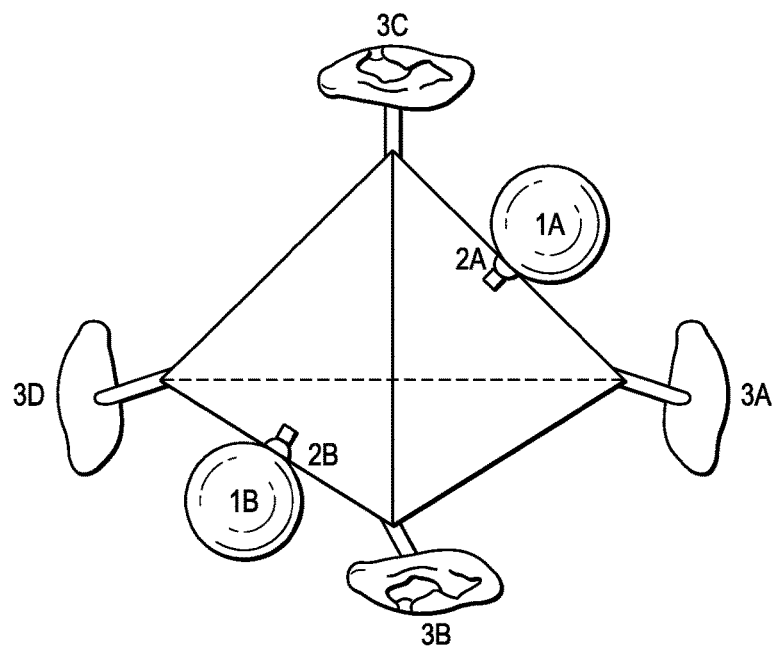
FIG. 8 depicts a variant of the auditory modification apparatus of FIG. 7 and an associated measurement technique using the apparatus.

The following describes a further example of applying the apparatus (such as shown in FIG. 7) in a manner specific to extraction of environmental characteristics, such as measuring the size of a room, the number of objects in a room, or more complex approaches to dynamically tracking multiple objects in space using passive or active acoustic methods. Similar to the prior example, and as shown in FIG. 8, one positions four measurement apparatus (items 3A, 3B, 3C and 3D) in a tetrahedral shape in order to maximize coverage of any possible observable object in the three-dimensional space surrounding the apparatus as a whole, with a minimum of three apparatus covering any object in any direction. In this example, one leverages measurement nodes that preferably are covered by an object made to simulate the shape and structure of the human ear, and ear canal, facing each direction outwardly. The shape of the human ear allows directional processing of the incoming signals at each ear based on reflections of the surfaces in the outer ear's shape, and the combination of four such measurements and their timing characteristics allows directional measurement of any perceived auditory signal without necessarily requiring any repositioning of the apparatus or measurement nodes. In the event the application benefits from generation of an acoustic signal, due either to the lack of noise, or the need for more measurements to capture the characteristics of the environment within a given timeframe, two acoustic synthesis nodes, labeled 2A and 2B, can generate short signals. Preferably, these signals pass through the fluid-filled or air-filled bladders at 1A and 1B, which cause the short signal to become reflected as a repeating reflective signal rather than one single signal, creating a multitude of diminishing size auditory waves to strike any objects to be measured in three-dimensional space. Situating the two auditory synthesis nodes on opposing sides of the apparatus as a whole allows full coverage of three-dimensional space, however, more could be used if needed. The resulting signals reflect off of objects, including objects within a space, and walls or other reflective surfaces, arriving at the four measurement nodes in a manner which indicates the timing of the signal, and the direction, based on the effects of the outer ear's reflection.

With the above-described arrangement, a computing element can then be used to analyze the timing of the incoming signals to determine the distance and directionality of any measured object in three-dimensional space. The combination of outer ear structures and multiple reflective signals created by the bladders results in a magnified number of measurable auditory signals and multiple effects on each signal due to the environment and the outer ear shapes' reflection of signals. The arrival times, and characteristics, of the incoming auditory signal at the measurement nodes, then reveals aspects of the environment that can facilitate rapid determination of the environment's component objects, size, distances, and potentially shapes, given enough signals and precision of measurement timing and waveforms.

Figure 9:
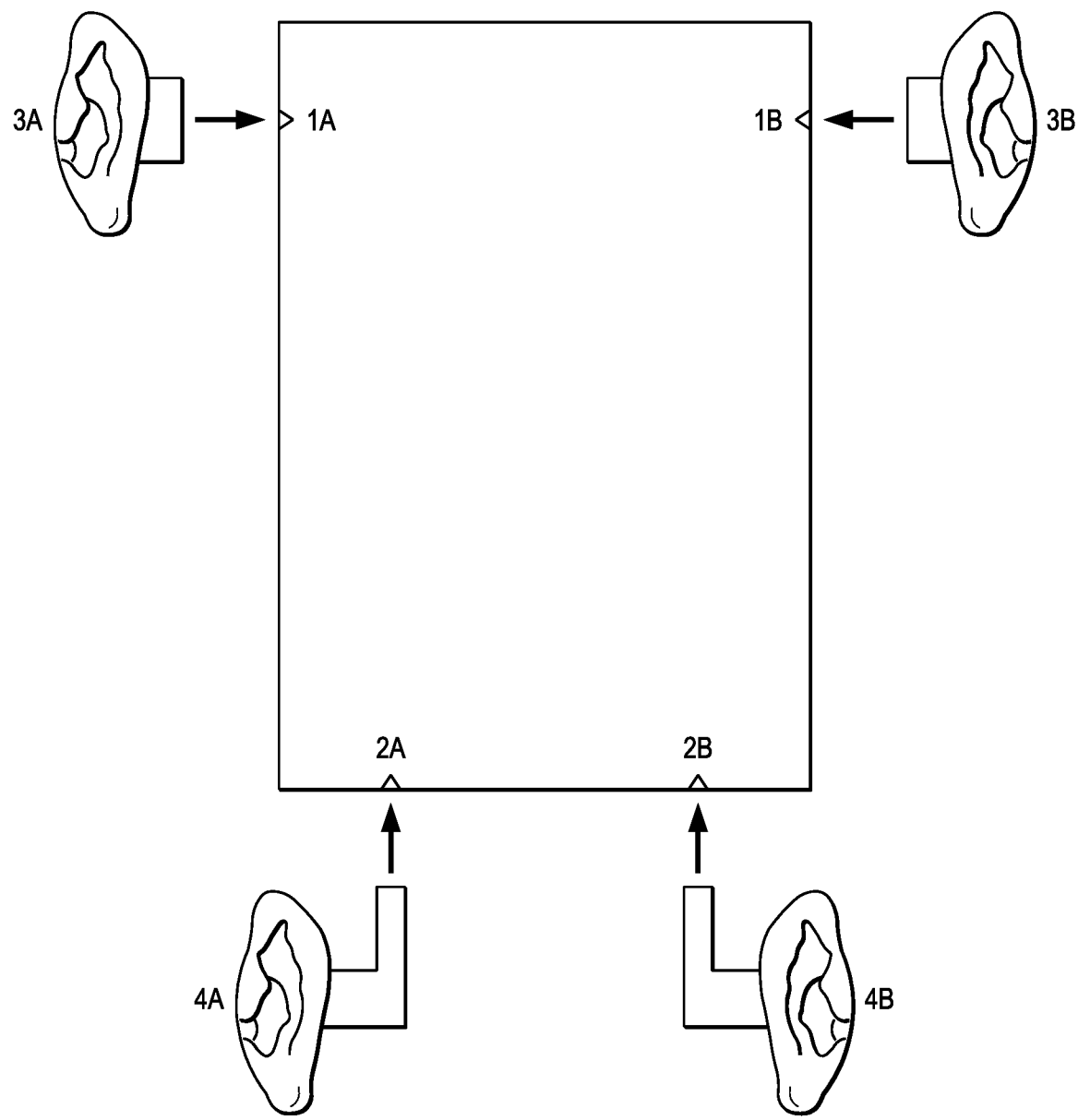
FIG. 9 depicts another variant of the auditory modification apparatus.

A commercial application of this technology to consumer video or audio recording is outlined in an additional example, shown in FIG. 9. In this diagram, the box represents an arbitrary cellular device, such as a telephone. This is not a limitation, as it could also represent any other piece of commercial consumer or professional equipment in which stereo or monaural microphones exist. A normal recording from such an instrument retains stereo characteristics of the recorded audio signal but loses directional characteristics when replayed. To facilitate preservation of the directional characteristics associated with those generated by the human ear, specifically to facilitate preservation of directional characteristics in a signal played back through headphones or a similar method, one can attach or otherwise leverage an apparatus on each microphone to affect the incoming auditory signal in the same manner as the human ear. In this example, the phone may have its stereo microphones situated on the side, as represented by items 1A and 1B. In this scenario, one would affix or position apparatus 3A and 3B onto the microphones. The phone may alternatively have stereo microphones situated on only one of its surfaces, such as the base, represented by 2A and 2B. In this scenario, a slightly-modified form of the apparatus, to preserve directionality of the signal, would be used, represented by items 4A and 4B, affixed or otherwise attached to the microphones 2A and 2B. This approach can be applied to nearly any example of stereoscopic recording contained within any other electronic apparatus, whether commercial, industrial, or professional in nature.

Generalizing, it can be seen that the apparatus is suited to extract intelligence about the world as a sensing mechanism, and it primarily acts by preventing the destruction of useful information that is present in the characteristics of the auditory signals in the environment. The destruction nearly always occurs in a solitary plain auditory sensor, but the structure helps ensure that some relevant characteristics of the auditory signal are preserved via transforming them into features at the measurement node.

While the above describes a particular order of operations performed by certain embodiments, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Having now described my invention, what I claim is set forth below.

The invention claimed is:

1. An apparatus, comprising:
an autonomous or remotely-controlled vehicle having a support; and
an auditory modification structure having a shape;
wherein the auditory modification structure is positioned on the support and wherein the autonomous or remotely-controlled vehicle is positioned relative to an auditory source, the auditory modification structure as positioned receiving an auditory signal from the auditory source and, by virtue of its shape and position, selectively alters a characteristic of the auditory signal; and
a detector to detect a characteristic of the auditory signal that has been altered by the shape and position of the auditory modification structure to extract information about an environment within which the autonomous or remotely-controlled vehicle is autonomously- or remotely-positioned.

2. The apparatus as described in claim 1 wherein the auditory modification structure comprises a substantially conical-shaped structure that provides a directional-focused action on the auditory signal.

3. The apparatus as described in claim 1 wherein the auditory modification structure comprises a fluid-filled or air-filled bladder that creates multiple reflections of the auditory signal based on a directionality of the auditory source.

4. The apparatus as described in claim 1 wherein the auditory modification structure comprises a reflective surface adapted to produce reflections of the auditory signal based on a directionality of the auditory source in relation to a plane that supports the reflective surface.

5. The apparatus as described in claim 1 wherein the characteristic of the auditory signal that is altered is one of: amplitude of the auditory signal, phase of the auditory signal, and frequency of the auditory signal.

6. The apparatus as described in claim 1 wherein the shape and position alter the auditory signal by one of: constructive, destructive, diffractive, reflective, reverberant, dispersive and phase-shifting effects.

7. The apparatus as described in claim 1 further including a mechanism to rotate the support to adjust a position of the auditory modification structure relative to the auditory source.

8. The apparatus as described in claim 1 wherein the information is one of: a directionality of the auditory signal, a size of a space associated with the environment, and a material associated with the environment.

9. An apparatus, comprising:
a vehicle; and
an auditory modification structure having a shape, and being positioned on the vehicle, the auditory modification structure as positioned receiving an auditory signal from an auditory source in an environment within which the vehicle is positioned;
a mechanism to act dynamically on the auditory modification structure to change one of: its shape, viscosity, chemical composition, material or position, during monitoring of the auditory signal from the auditory source; and
a computing element to detect a characteristic of the auditory signal that has been altered by the auditory modification structure.

* * * * *